United States Patent
Griep

(10) Patent No.: US 7,987,450 B2
(45) Date of Patent: Jul. 26, 2011

(54) STACK-BASED PROBLEM IDENTIFICATION FOR A SOFTWARE COMPONENT

(75) Inventor: Jonathan P. Griep, Wilton, CT (US)

(73) Assignee: International Business Machines Corporation, Armonk, NY (US)

(*) Notice: Subject to any disclaimer, the term of this patent is extended or adjusted under 35 U.S.C. 154(b) by 1599 days.

(21) Appl. No.: 11/305,961

(22) Filed: Dec. 19, 2005

(65) Prior Publication Data
US 2007/0169085 A1 Jul. 19, 2007

(51) Int. Cl.
G06F 9/44 (2006.01)
G06F 11/00 (2006.01)
G08C 25/00 (2006.01)
H03M 13/00 (2006.01)
H04L 1/00 (2006.01)

(52) U.S. Cl. ........ 717/124; 717/125; 717/126; 717/127; 717/131; 714/799

(58) Field of Classification Search ............... 707/3, 4; 709/217, 218, 219; 711/132; 714/48–54, 714/799; 717/124, 125, 126, 127, 131
See application file for complete search history.

(56) References Cited

U.S. PATENT DOCUMENTS

| | | | |
|---|---|---|---|
| 6,058,494 A * | 5/2000 | Gold et al. | 714/42 |
| 6,735,721 B1 | 5/2004 | Morrow et al. | |
| 6,738,762 B1 | 5/2004 | Chen et al. | |
| 6,751,789 B1 | 6/2004 | Berry et al. | |
| 7,165,097 B1 * | 1/2007 | Mackin et al. | 709/218 |
| 2003/0066049 A1 | 4/2003 | Atwood et al. | |
| 2003/0158944 A1 | 8/2003 | Branson et al. | |
| 2004/0075690 A1 | 4/2004 | Cirne | |
| 2004/0103412 A1 * | 5/2004 | Rao et al. | 717/171 |
| 2004/0128583 A1 * | 7/2004 | Iulo et al. | 714/25 |
| 2004/0133882 A1 | 7/2004 | Angel et al. | |
| 2004/0194063 A1 * | 9/2004 | Pereira | 717/124 |
| 2004/0250175 A1 * | 12/2004 | Draine et al. | 714/46 |
| 2004/0268342 A1 | 12/2004 | Hyden et al. | |
| 2005/0066236 A1 * | 3/2005 | Goeller et al. | 714/39 |
| 2005/0120273 A1 * | 6/2005 | Hudson et al. | 714/38 |
| 2005/0182841 A1 | 8/2005 | Sharp | |
| 2006/0253837 A1 * | 11/2006 | Hudson et al. | 717/124 |

* cited by examiner

Primary Examiner — Emerson C Puente
Assistant Examiner — Jonathan R Labud
(74) Attorney, Agent, or Firm — Raymond Szeto; Hoffman Warnick LLC

(57) ABSTRACT

A solution for managing one or more problems in a software component is provided. The solution includes generating an identifier for each problem based on a call stack for the execution of the software component when the problem occurs. The identifier and a text message for the problem can be displayed to a user. The user can use the identifier to obtain information on the problem and/or one or more updates that address the problem. In one embodiment, the identifier comprises a hash value of the call stack, which is likely to result in a unique value for each possible call stack. In this manner, the identifier will likely provide a unique identifier for each problem.

19 Claims, 3 Drawing Sheets

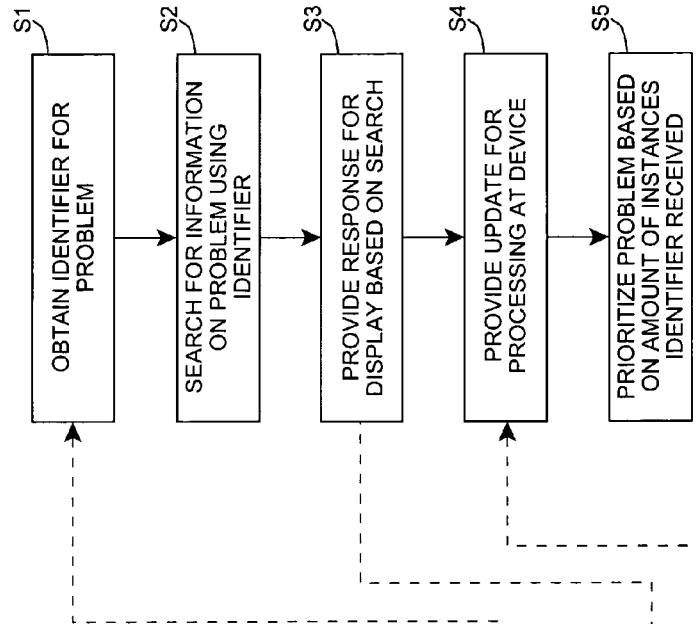
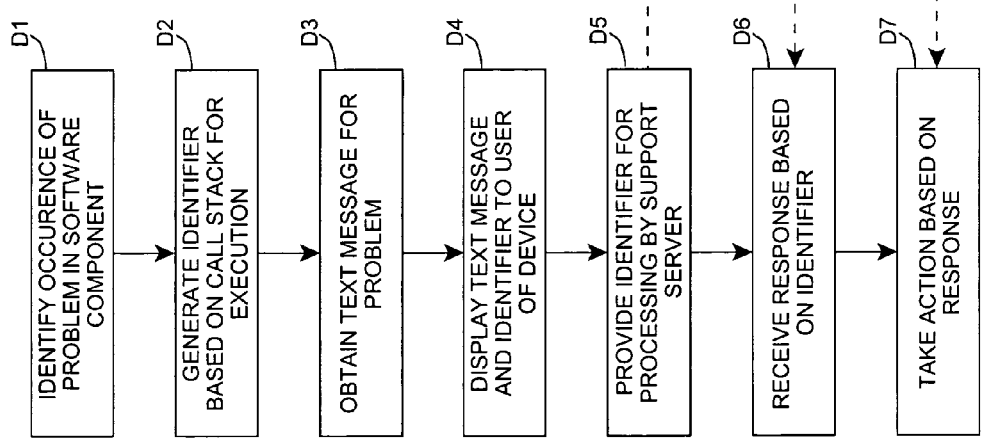

STACK-BASED PROBLEM IDENTIFICATION FOR A SOFTWARE COMPONENT

FIELD OF THE INVENTION

The invention relates generally to managing a problem in a software component, and more particularly, to a solution for identifying the problem based on a call stack for the software component.

BACKGROUND OF THE INVENTION

Frequently, a software component that is provided for use by customers includes one or more problems. These problems can range from minor (e.g., functionality incorrectly and/or partially implemented) to severe (e.g., an application error or a stack overflow problem). However, due to the complexity of the software component and/or its interaction with a particular computer system, the cause of various problems is often difficult to identify, making these problems difficult to report, difficult to reproduce, difficult to correct, and/or the like. To this extent, managing these problems can be cumbersome for the customer and/or the software provider, resulting in an increased frustration for the customer, an increased cost for technical support, and the like.

To date, a software component that encounters a problem will typically display a user-friendly message to the user informing him/her of the problem and possibly requesting some action in response (e.g., terminate execution, inform software provider, and/or the like). However, in the software component, there may be numerous execution paths, only a small number of which may be problematic, which will result in the same message. As a result, the usefulness of such a message to the software provider is often limited.

In one approach, a computed hash value, which may be based on stack trace information, is used to determine whether an update package containing a bug fix exists. If so, the update package is retrieved and applied to the firmware/software of an electronic device. However, users generally do not wish to have updates and/or the like to be automatically performed on their computer systems. Further, this approach fails to provide a solution for identifying the problem for the user and/or reporting a problem for which an update package may or may not exist.

In view of the foregoing, there exists a need in the art to overcome one or more of the deficiencies indicated herein.

BRIEF SUMMARY OF THE INVENTION

The invention provides a solution for managing one or more problems in a software component. The solution includes generating an identifier for each problem based on a call stack for the execution of the software component when the problem occurs. The identifier and a text message for the problem can be displayed to a user. The user can use the identifier to obtain information on the problem and/or one or more updates that address the problem. In one embodiment, the identifier comprises a hash value of the call stack, which is likely to result in a unique value for each possible call stack. In this manner, the identifier will likely provide a unique identifier for each problem, which can be used by a user and/or analyst to manage information on the problem and/or update(s) that address the problem.

A first aspect of the invention provides a method of managing a problem in a software component, the method comprising: generating an identifier for the problem based on a call stack for the execution of the software component; obtaining a text message for the problem; and providing the text message and the identifier for display to a user.

A second aspect of the invention provides a method of managing a problem in a software component, the method comprising: obtaining an identifier for the problem, the identifier based on a call stack for the execution of the software component; searching for information on the problem using the identifier; and providing a response for display to a user based on the searching.

A third aspect of the invention provides a system for managing a problem in a software component, the system comprising: a system for generating an identifier for the problem based on a call stack for the execution of the software component; a system for obtaining a text message for the problem; and a system for providing the text message and the identifier for display to a user.

A fourth aspect of the invention provides a system for managing a problem in a software component, the system comprising: a system for obtaining an identifier for the problem, the identifier based on a call stack for the execution of the software component; a system for searching for information on the problem using the identifier; and a system for providing a response for display to a user based on the searching.

A fifth aspect of the invention provides a program product stored on a computer-readable medium, which when executed, enables a computer infrastructure to manage a problem in a software component, the program product comprising computer program code for enabling the computer infrastructure to: generate an identifier for the problem based on a call stack for the execution of the software component; obtain a text message for the problem; and provide the text message and the identifier for display to a user.

A sixth aspect of the invention provides a program product stored on a computer-readable medium, which when executed, enables a computer infrastructure to manage a problem in a software component, the program product comprising computer program code for enabling the computer infrastructure to: obtain an identifier for the problem, the identifier based on a call stack for the execution of the software component; search for information on the problem using the identifier; and provide a response for display to a user based on the searching.

A seventh aspect of the invention provides a method of generating a system for managing a problem in a software component, the method comprising: providing a computer infrastructure operable to: generate an identifier for the problem based on a call stack for the execution of the software component; obtain a text message for the problem; and provide the text message and the identifier for display to a user.

An eighth aspect of the invention provides a method of generating a system for managing a problem in a software component, the method comprising: providing a computer infrastructure operable to: obtain an identifier for the problem, the identifier based on a call stack for the execution of the software component; search for information on the problem using the identifier; prioritize a plurality of problems based on an amount of instances that a corresponding identifier is received for each of the plurality of problems; and provide a response for display to a user based on the searching.

A ninth aspect of the invention provides a business method for managing a problem in a software component, the business method comprising managing a computer infrastructure that performs the process described herein; and receiving payment based on the managing.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIGS. 2A-B show illustrative device-side and server-side processes, respectively, which can be implemented by the computer infrastructure of FIG. 1 according to an embodiment of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for managing one or more problems in a software component. The solution includes generating an identifier for each problem based on a call stack for the execution of the software component when the problem occurs. The identifier and a text message for the problem can be displayed to a user. The user can use the identifier to obtain information on the problem and/or one or more updates that address the problem. In one embodiment, the identifier comprises a hash value of the call stack, which is likely to result in a unique value for each possible call stack. In this manner, the identifier will likely provide a unique identifier for each problem, which can be used by a user and/or analyst to manage information on the problem and/or update(s) that address the problem. As used herein, unless otherwise noted, the term "set" means one or more (i.e., at least one).

Figure 1:
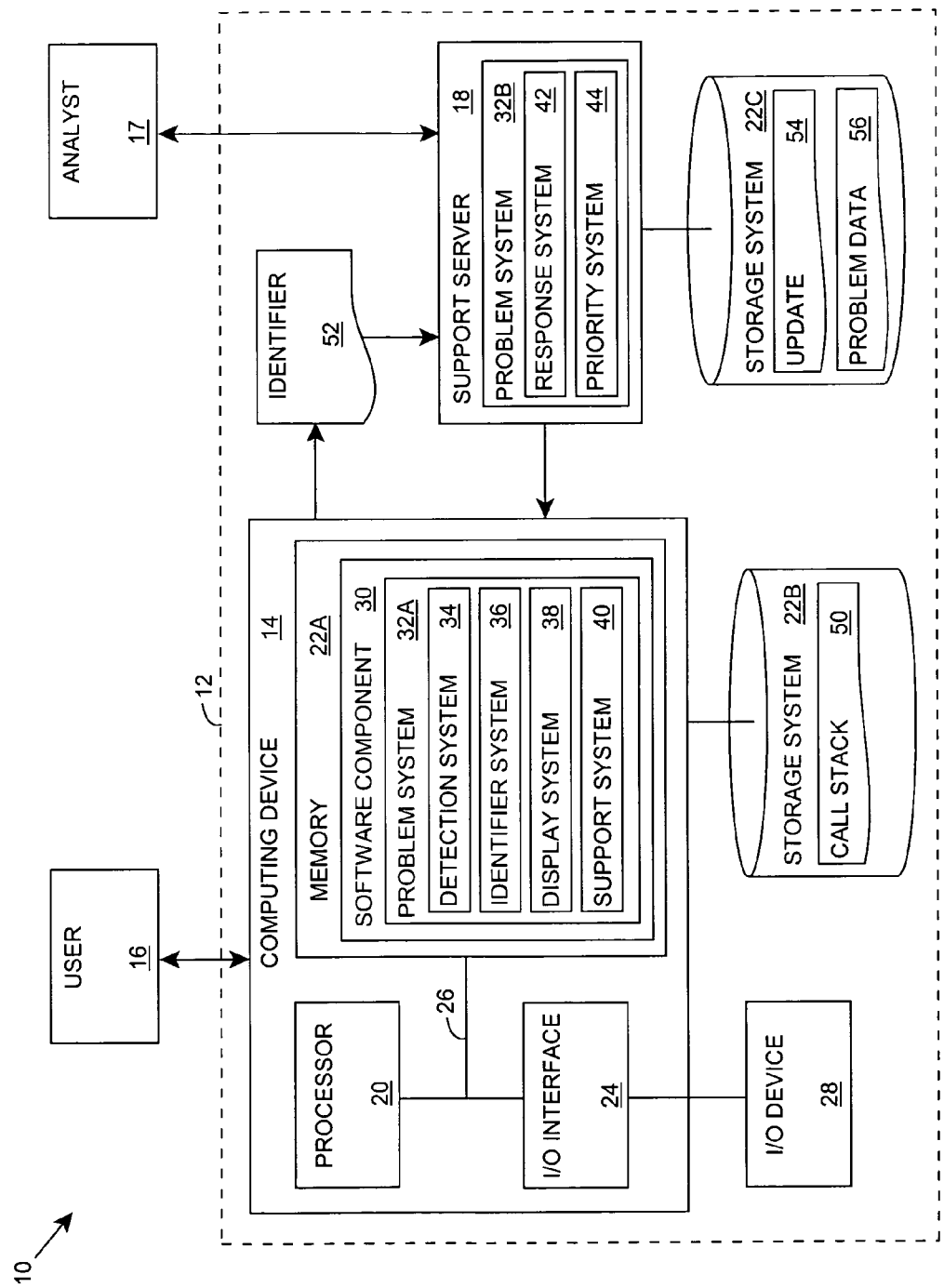
FIG. 1 shows an illustrative environment for managing a problem in a software component according to an embodiment of the invention.

Turning to the drawings, FIG. 1 shows an illustrative environment 10 for managing a problem in a software component 30 according to an embodiment of the invention. To this extent, environment 10 includes a computer infrastructure 12 that can perform the process described herein in order to manage the problem. In particular, computer infrastructure 12 is shown including a computing device 14 that comprises a problem system 32A, which makes computing device 14 operable to manage the problem by performing the device-side process described herein. Further, computer infrastructure 12 is shown including a support server 18, which can include a problem system 32B that makes support server 18 operable to manage the problem by performing the server-side process described herein.

Computing device 14 is shown including a processor 20, a memory 22A, an input/output (I/O) interface 24, and a bus 26. Further, computing device 14 is shown in communication with an external I/O device/resource 28 and a storage system 22B. As is known in the art, in general, processor 20 executes computer program code, such as software component system 30, which is stored in memory 22A and/or storage system 22B. While executing computer program code, processor 20 can read and/or write data to/from memory 22A, storage system 22B, and/or I/O interface 24. Bus 26 provides a communications link between each of the components in computing device 14. I/O device 28 can comprise any device that enables an individual to interact with computing device 14 or any device that enables computing device 14 to communicate with one or more other computing devices using any type of communications link. It is understood that support server 18 can comprise the same components (processor, memory, I/O interface, storage system 22C, etc.) as shown for computing device 14. These components have not been separately shown and discussed for brevity.

In any event, computing device 14 and/or support server 18 can comprise any general purpose computing article of manufacture capable of executing computer program code installed thereon (e.g., a personal computer, server, handheld device, etc.). However, it is understood that computing device 14 and problem system 32A and support server 18 and problem system 32B are only representative of various possible equivalent computing devices that may perform the process described herein. To this extent, in other embodiments, the functionality provided by computing device 14 and problem system 32A and/or support server 18 and problem system 32B can be implemented by one or more computing articles of manufacture, each of which includes any combination of general and/or specific purpose hardware and/or computer program code. In each embodiment, the program code and hardware can be created using standard programming and engineering techniques, respectively.

Similarly, computer infrastructure 12 is only illustrative of various types of computer infrastructures for implementing the invention. For example, computing device 14 and/or support server 18 each can comprise two or more computing devices (e.g., a server cluster) that communicate over any type of communications link, such as a network, a shared memory, or the like, to perform the process described herein. Alternatively, both problem systems 32A-B could be implemented on a single computing device 14. Further, while performing the process described herein, computing device 14 and support server 18 can communicate with one another and/or one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols. Still further, while shown including both computing device 14 and support server 18, it is understood that alternative embodiments of computer infrastructure 12 can include only computing device 14 or only support server 18.

As discussed herein, problem systems 32A-B, either alone or in combination, enable computer infrastructure 12 to manage a problem in software component 30. To this extent, problem system 32A is shown including a detection system 34, an identifier system 36, a display system 38, and a support system 40, and problem system 32B is shown including a response system 42 and a priority system 44. Operation of each of these systems is discussed further herein. However, it is understood that some of the various systems shown in FIG. 1 can be implemented independently, combined, and/or stored in memory for one or more separate computing devices that are included in computer infrastructure 12. For example, some or all of problem system 32A could be implemented as part of an operating system on computing device 14 and/or as a "plug-in" software application that is provided apart from software component 30 and communicates with software component 30 and/or the operating system using an Application Program Interface (API) or the like. Further, it is understood that some of the systems and/or functionality may not be implemented, or additional systems and/or functionality may be included as part of computer infrastructure 12.

In general, software component 30 can execute on computing device 14. In order to execute software component 30, computing device 14 (e.g., an operating system on computing device 14) can maintain various state information for software component 30. Included in the state information is a call stack 50. Call stack 50 defines a code path that was taken to the present state of the execution of software component 30. To this extent, call stack 50 comprises information on a sequence of routines called in software component 30. While executing software component 50, as processing completes in a current routine, computing device 14 removes the top routine from call stack 50 and returns control to it. Use of call stack 50 enables a single routine in software component 30 to be called from multiple other routines and return to the correct calling routine when processing is complete.

The invention provides a solution for managing a problem that occurs during the execution of software component 30. FIGS. 2A-B show illustrative device-side and server-side processes, respectively, which can be implemented by computer infrastructure 12 of FIG. 1 according to an embodiment of the invention. Referring to FIGS. 1-2A-B, in step D1, while computing device 14 is executing software component 30, detection system 34 may identify an occurrence of a problem. Detection system 34 can identify the occurrence using any solution. For example, detection system 34 can monitor the operating system and/or software component 30 for state(s) and/or message(s) that indicate the problem. Alternatively, software component 30 can call a routine in detection system 34 and/or send a message to detection system 34 when the problem occurs and/or in response to user 16 indicating the occurrence of the problem.

In any event, in step D2, identifier system 36 generates an identifier 52 for the problem based on call stack 50. In general, it is desirable that it is highly probable that identifier 52 will be unique for each call stack 50. In this manner, identifier 52 will have a high probability of uniquely identifying each problem. In one embodiment, identifier 52 comprises a hash value that identifier system 36 computes based on call stack 50. The hash value can be computed using any solution. For example, for a compiled language, call stack 50 may include memory addresses for each routine. In this case, identifier system 36 could add all the memory addresses to generate the hash value. Similarly, for a script language, call stack 50 may include the names of each routine. In this case, identifier system 36 could add a value assigned to each letter in the name, the first X letters of each name, and/or the like. In either case, it is understood that call stack 50 could include other information that is likely to result in a unique hash value (e.g., call parameters). Further, it is understood that the hash value could be based on only a portion of call stack 50 (e.g., the last ten entries). Regardless, identifier system 36 can generate identifier 52 using the hash value. In one embodiment, the hash value is used as identifier 52. Alternatively, identifier system 36 can combine the hash value with other identifying information (e.g., the current routine) to generate identifier 52.

In step D3, display system 38 can obtain a text message for the problem. The text message can comprise a user-friendly notification of the problem that occurred. Display system 38 can obtain the text message using any solution. For example, software component 30 can maintain a set of pre-formatted text messages for display for various types of problems. In this case, display system 38 can select the pre-formatted text message based on the problem. Alternatively, display system 38 can use a generic text message for all types of problems. In either case, display system 38 can include one or more dynamic text strings in the text message based on the state of the execution of software component 30 (e.g., the routine in which the error occurred).

In step D4, display system 38 can provide the text message and identifier 52 for display to user 16. To this extent, display system 38 can generate a user interface that includes both the text message and identifier 52 and subsequently display the user interface and/or communicate it to computing device 14 for display. Alternatively, display system 38 can provide the text message and identifier 52 to another system (e.g., the operating system) which in turn generates and displays a user interface including both the text message and identifier 52. In any event, display system 38 can generate a display string based on both the text message and identifier 52, which is subsequently displayed in the user interface.

Figure 3:
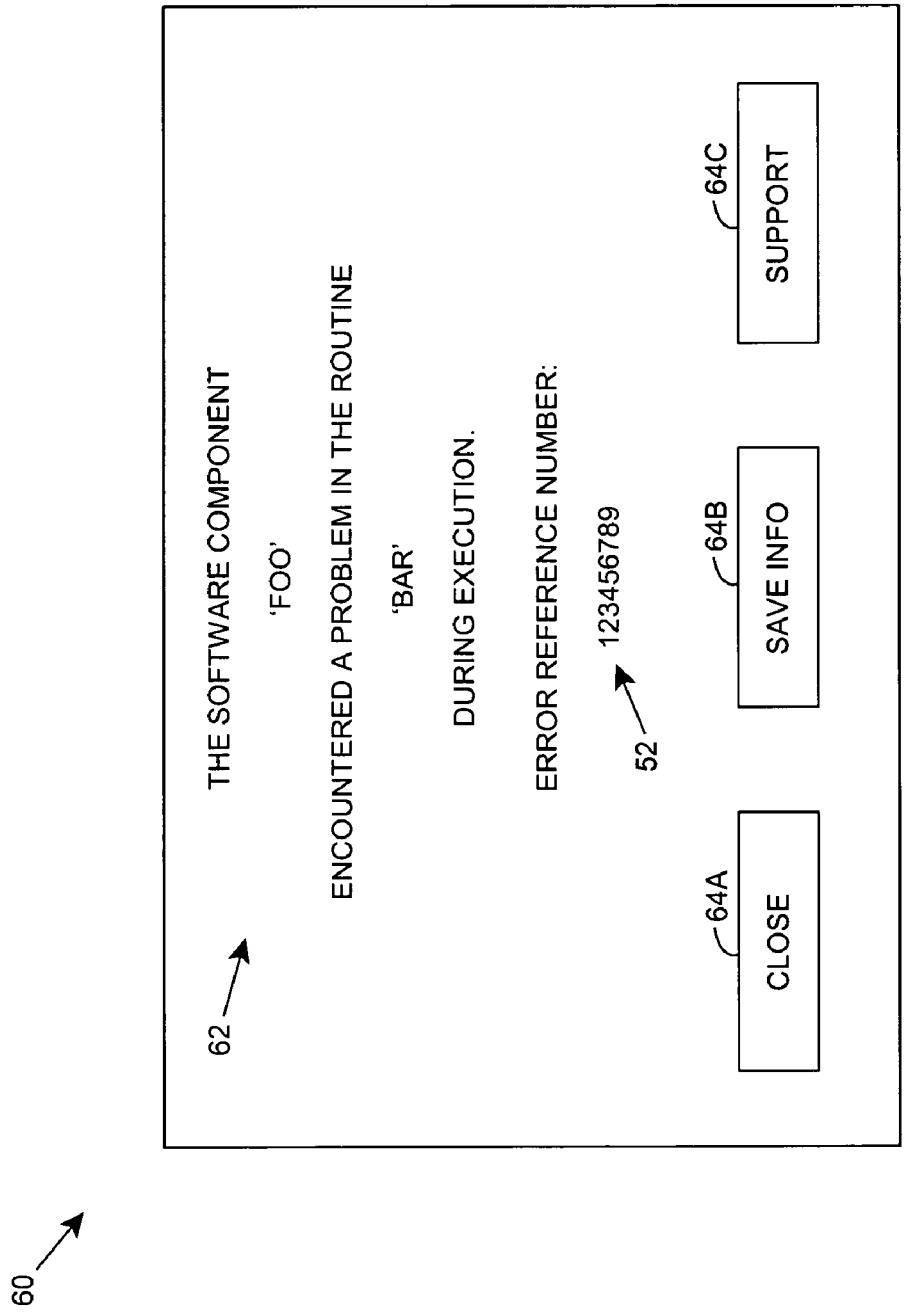
FIG. 3 shows an illustrative user interface for displaying a text message and an identifier for a problem according to an embodiment of the invention.

FIG. 3 shows an illustrative user interface 60 for displaying a text message 62 and identifier 52 according to an embodiment of the invention. As shown, text message 62 provides a user-friendly identification of the problem, while identifier 52 provides user 16 (FIG. 1) with an ability to seek a solution to the problem. To this extent, user interface 60 can include one or more user interface controls 64A-C. Each user interface control 64A-C enables user 16 to select an action to perform in response to the problem. For example, user interface control 64A enables user 16 to close user interface 60 without taking any further action. Depending on the problem, each action may result in the execution of software component 30 being halted.

Referring to FIGS. 1 and 3, when user 16 selects user interface control 64B, support system 40 can save various information on the problem at computing device 14, e.g., in a file stored in storage system 22B. For example, the information can include identifier 52, some or all of call stack 50, the current routine, the values of one or more variables (global and/or local), and/or the like. The saved information can then be provided to technical support as a later time.

When user 16 selects user interface control 64C, support system 40 can be used to contact technical support. The technical support can be contacted using any solution desired by user 16. To this extent, support system 40 can generate a user interface that enables user 16 to select how to contact technical support. For example, the user interface can display a telephone number that user 16 can use to call a technical support individual. Alternatively, support system 40 can generate an electronic message, and or request a technical support web page for display to user 16.

In any event, returning to FIGS. 1 and 2A-B, in step D5, support system 40 and/or user 16 can provide identifier 52 for processing by support server 18. For example, user 16 can provide identifier 52 to a technical support individual, who in turn can enter identifier 52 into support server 18. Alternatively, support system 40 can provide identifier 52 to support server 18 via an electronic message (e.g., within an email, as a parameter for a web page, and/or the like). In the latter case, support system 40 can obtain a communications identifier (e.g., an email address, a universal resource locator, and/or the like) for support server 18 and provide identifier 52 to support system 40 using the communications identifier. The communications identifier can be obtained for example, from one or more parameters stored on computing device 14 for software component 30.

In general, support server 18 can comprise a problem system 32B, which can be used by a software vendor to manage support for one or more of its software components. To this extent, one or more analysts 17 can use problem system 32B to perform various support-related operations. For example, analyst 17 can comprise a technical support individual that logs and/or reviews problem data 56 that is received from user 16 for a particular problem. Further, analyst 17 can comprise a developer that reviews and/or updates problem data 56 for software component 30 and/or generates an update 54, which implements one or more corrections to software component 30 based on the problem(s).

As a result, problem system 34B can manage a set of updates 54 and a set of problem data 56 for one or more problems of software component 30. Problem data 56 can comprise a description of the problem, a status of correcting the problem, and/or one or more workarounds for the problem. Each update 54 can comprise a modification to one or more routines within and/or settings for software component 30. The modification can correct a problem in software component 30. To this extent, an update 54 can be provided to computing device 14 and applied to software component 30 in response to a detected problem. The problem data 56 and update 54 for a particular problem each can have a corresponding identifier 52 associated therewith. In this manner, support server 18 can use identifier 52 to locate problem data 56 and/or update(s) 54. It is understood that the association between identifier 52 and problem data 56 and/or update 54 can comprise a "many to many" relationship. That is a single identifier 52 can be associated with multiple instances of problem data 56 (e.g., records in a database, files in a file system, and/or the like) and/or updates 54. Similarly, each update 54 and/or instance of problem data 56 can be associated with multiple identifiers 52 (e.g., when the same update addresses and/or the same problem is encountered via multiple code paths, each resulting in a different identifier 52).

In any event, in step S1, support server 18 can obtain identifier 52 for a problem (e.g., via analyst 17 and/or computing device 14). In step S2, problem system 32B can search for information on the problem using identifier 52. In particular, problem system 32B can search the set of updates 54 and/or the set of problem data 56 to identify any entries that are associated with the particular identifier. In step S3, response system 42 can provide a response for display to user 16 and/or analyst 17 based on the search.

Several responses are possible. For example, when the search results in no entries in either the set of updates 54 or the set of problem data 56, response system 42 can provide a response indicating that no information was found for the problem. In this case, the response can request that the individual confirm the correct entry of identifier 52 and/or provide additional information on the problem. When the correct identifier 52 was entered, problem system 32B can create a new entry in problem data 56 using the information provided by user 16, and associate identifier 52 with the new entry in problem data 56. Further, problem system 32B can generate a message informing an analyst 17 that a new problem in software component 30 has been added to the set of problem data 56 and providing the corresponding identifier 52.

When problem system 32B locates problem data 56 for the problem using identifier 52, response system 42 can generate a response that includes some or all of problem data 56 and/or an address at which user 16 can access problem data 56. Similarly, when problem system 32B locates one or more updates 54 using identifier 52, response system 42 can generate a response that includes information on how to access each update 54 and/or a procedure for implementing each update 54 on computing device 14. In this manner, user 16 can be informed of the problem and provided with options for responding to the problem.

In any event, in step D6, computing device 14 can receive the response based on the search using identifier 52. In step D7, user 16 can decide to take one or more actions based on the response. For example, user 16 may decide to implement one or more updates 54 on computing device 14. In this case, support system 40 can request update(s) 54 from support server 18, e.g., by providing identifier 52 in an update request message. In step S4, support server 18 can receive the request and provide update(s) 54 for software component 30 for installation on computing device 14. Subsequently, support system 40 can obtain each update 54. When all update(s) 54 have been received, support system 40 can prompt user 16 to install the update(s) 54. Once support system 40 obtains a request to install update(s) 54, support system 40 can initiate and/or perform some or all of the installation.

Problem system 32B can perform various other operations on problem data 56 and/or update 54 using identifier 52. For example, problem system 32B can include a priority system 44 that, in step S5, prioritizes each problem in software component 30 based on an amount of instances that a corresponding identifier 52 has been received. To this extent, when software component 30 is first released, there may be no or relatively few known problems. As users 16 purchase and use software component 30 problems may be found. As each user 16 finds a problem, support system 40 may provide the identifier 52 for use on support server 18. Priority system 44 can maintain a total number of instances that each identifier 52 has been received. An identifier 52 that has been received more times will indicate that the problem is occurring more frequently. As a result, this problem can be given a higher priority for fixing than those identifiers 52 received relatively fewer times.

It is understood that the various steps shown in FIGS. 2A-B, and the order thereof, are only illustrative. To this extent, one or more additional steps may be included, two or more steps could be combined, and/or one or more steps could be removed. Further, it is understood that the order of the various steps could be altered. For example, one or more steps could be performed concurrently.

While shown and described herein as a method and system for managing a problem in a software component, it is understood that the invention further provides various alternative embodiments. For example, in one embodiment, the invention provides a program product stored on a computer-readable medium, which when executed, enables a computer infrastructure to manage a problem in a software component. To this extent, the computer-readable medium includes program code, such as problem system 32A (FIG. 1), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), as a data signal traveling over a network (e.g., during a wired/wireless electronic distribution of the program product), and/or the like.

In another embodiment, the invention provides a method of generating a system for managing a problem in a software component. In this case, a computer infrastructure, such as computer infrastructure 12 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

In still another embodiment, the invention provides a business method that performs the process described herein on a subscription, advertising, and/or fee basis. That is, a service provider, such as an Systems Integrator, could offer to manage a problem in a software component as described herein. In this case, the service provider can manage (e.g., create, maintain, support, etc.) a computer infrastructure, such as computer infrastructure 12 (FIG. 1), that performs the process described herein for one or more customers. In return, the service provider can receive payment from the customer(s) under a subscription and/or fee agreement and/or the service provider can receive payment from the sale of advertising to one or more third parties.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of managing a problem in a software component, the method comprising:
    generating an identifier for the problem based on a call stack for the execution of the software component using a computing device;
    obtaining a text message for the problem using the computing device; and
    providing a user interface including the text message and the identifier for display to a user using the computing device, wherein the user interface includes: a user interface control enabling the user to close the user interface without further action, a user interface control enabling the user to store the identifier, and a user interface control enabling the user to provide the identifier for processing by a support server.

2. The method of claim 1, further comprising identifying an occurrence of the problem.

3. The method of claim 1, further comprising:
    obtaining a communications identifier for the support server; and
    providing the identifier for processing on the support server.

4. The method of claim 3, further comprising receiving a response based on the identifier.

5. The method of claim 1, the generating including computing a hash value based on the call stack, the identifier comprising the hash value.

6. The method of claim 1, further comprising:
    obtaining an update for the software component based on the identifier; and
    obtaining a request to install the update from the user.

7. The method of claim 1, further comprising:
    obtaining the identifier for the problem on a server;
    searching a database for information on the problem using the identifier; and
    providing a response for display to the user based on the searching.

8. A system for managing a problem in a software component, the system comprising:
    a computing device including:
        a system for obtaining an identifier for the problem, the identifier based on a call stack for the execution of the software component;
        a system for prioritizing a plurality of problems according to an amount of instances that a corresponding identifier is received for each of the plurality of problems;
        a system for searching for information on the problem using the identifier; and
        a system for providing a response for display to a user in a user interface based on the searching, wherein the response allows the user to ignore or accept any updates or fixes provided in the response.

9. The system of claim 8, the computing device further including a system for providing an update for the software component for installation based on the identifier.

10. The system of claim 8, the computing device further including a system for generating the identifier for the problem.

11. The system of claim 10, the system for generating including a system for computing a hash value based on the call stack, the identifier comprising the hash value.

12. A program product stored on a computer-readable storage medium, which when executed, enables a computer infrastructure to manage a problem in a software component, the program product comprising computer program code for enabling the computer infrastructure to:
    generate an identifier for the problem based on a call stack for the execution of the software component;
    obtain a text message for the problem; and
    provide a user interface including the text message and the identifier for display to a user, wherein the user interface includes: a user interface control enabling the user to close the user interface without further action, a user interface control enabling the user to store the identifier, and a user interface control enabling the user to provide the identifier for processing by a support server.

13. The program product of claim 12, further comprising computer program code for enabling the computer infrastructure to identify an occurrence of the problem.

14. The program product of claim 12, further comprising computer program code for enabling the computer infrastructure to:
    obtain a communications identifier for the support server; and
    provide the identifier for processing on the support server.

15. The program product of claim 14, further comprising computer program code for enabling the computer infrastructure to receive a response based on the identifier.

16. The program product of claim 12, the computer program code for enabling the computer infrastructure to generate including computer program code for enabling the computer infrastructure to compute a hash value based on the call stack, the identifier comprising the hash value.

17. The program product of claim 12, further comprising computer program code for enabling the computer infrastructure to:

obtain an update for the software component based on the identifier; and obtain a request to install the update from the user.

18. A method of generating a system for managing a problem in a software component, the method comprising:

providing a computer infrastructure operable to:

obtain an identifier for the problem, the identifier based on a call stack for the execution of the software component;

search for information on the problem using the identifier;

prioritize a plurality of problems based on an amount of instances that a corresponding identifier is received for each of the plurality of problems; and provide a response for display to a user in a user interface based on the searching, wherein the response allows the user to ignore or accept any updates or fixes provided in the response.

19. The method of claim 18, the computer infrastructure being further operable to generate the identifier for the problem by computing a hash value based on the call stack.

* * * * *